(12) United States Patent
Nojiri

(10) Patent No.: US 10,107,689 B2
(45) Date of Patent: Oct. 23, 2018

(54) INFRARED TEMPERATURE SENSOR AND DEVICE USING INFRARED TEMPERATURE SENSOR

(71) Applicant: SEMITEC Corporation, Tokyo (JP)

(72) Inventor: Toshiyuki Nojiri, Tokyo (JP)

(73) Assignee: SEMITEC Corporation, Tokyo (JP)

( * ) Notice: Subject to any disclaimer, the term of this patent is extended or adjusted under 35 U.S.C. 154(b) by 241 days.

(21) Appl. No.: 14/909,138

(22) PCT Filed: Aug. 6, 2014

(86) PCT No.: PCT/JP2014/070705
§ 371 (c)(1),
(2) Date: Jan. 31, 2016

(87) PCT Pub. No.: WO2015/020081
PCT Pub. Date: Feb. 12, 2015

(65) Prior Publication Data
US 2016/0169745 A1 Jun. 16, 2016

(30) Foreign Application Priority Data

Aug. 9, 2013 (JP) .................................. 2013-166563

(51) Int. Cl.
*G01J 5/04* (2006.01)
*G01J 5/10* (2006.01)
*G01J 5/08* (2006.01)

(52) U.S. Cl.
CPC .................. *G01J 5/04* (2013.01); *G01J 5/045* (2013.01); *G01J 5/0853* (2013.01); *G01J 5/10* (2013.01)

(58) Field of Classification Search
CPC .... G01J 5/04; G01J 5/041; G01J 5/045; G01J 5/048; G01J 5/0285; G01J 5/0853; G01J 5/10
See application file for complete search history.

(56) References Cited

U.S. PATENT DOCUMENTS

| 5,683,181 A | * | 11/1997 | Shepard | ................... G01J 5/02 374/126 |
| 5,914,488 A | * | 6/1999 | Sone | ........................ G01J 5/04 250/332 |

(Continued)

FOREIGN PATENT DOCUMENTS

| CN | 102401699 | 4/2012 |
| JP | H05-66529 | 9/1993 |

(Continued)

OTHER PUBLICATIONS

"International Search Report (Form PCT/ISA/210) of PCT/JP2014/070705", dated Sep. 2, 2014, with English translation thereof, pp. 1-4.

*Primary Examiner* — Lisa Caputo
*Assistant Examiner* — Philip Cotey
(74) *Attorney, Agent, or Firm* — JCIPRNET

(57) ABSTRACT

Provided are: an infrared temperature sensor which is reduced in film deformation and achieves higher accuracy, while ensuring reliability; and a device which uses this infrared temperature sensor. An infrared temperature sensor is provided with: a film which absorbs infrared light; a case which covers and holds the film so as to form airtight spaces between itself and the film, and which is provided with a light guide part that has an opening and guides infrared light and a shielding part that has a shielding wall and shields infrared light; ventilation portion which allow air permeation between the spaces and the outside; a heat-sensitive element for infrared detection, which is arranged on the film at a position that corresponds to the light guide part; and a heat-sensitive element for temperature compensation, which is arranged on the film at a position that corresponds to the shielding part.

11 Claims, 13 Drawing Sheets

(56) References Cited

U.S. PATENT DOCUMENTS

| | | | | |
|---|---|---|---|---|
| 6,236,046 | B1* | 5/2001 | Watabe | G01J 5/04 |
| | | | | 250/330 |
| 2001/0040248 | A1* | 11/2001 | Toyoda | H01L 29/84 |
| | | | | 257/254 |
| 2003/0071215 | A1* | 4/2003 | Ajisawa | G01J 5/20 |
| | | | | 250/338.1 |
| 2003/0123517 | A1* | 7/2003 | Nojiri | G01J 5/041 |
| | | | | 374/120 |
| 2008/0062426 | A1* | 3/2008 | Yoshida | G01N 21/3504 |
| | | | | 356/454 |
| 2010/0130838 | A1* | 5/2010 | Kermani | G01J 5/04 |
| | | | | 600/310 |
| 2012/0018639 | A1* | 1/2012 | Matsumoto | F24F 1/0007 |
| | | | | 250/353 |
| 2012/0055244 | A1* | 3/2012 | Dolce | G01J 1/0271 |
| | | | | 73/170.27 |
| 2013/0032717 | A1* | 2/2013 | Saito | G01J 5/0225 |
| | | | | 250/338.1 |

FOREIGN PATENT DOCUMENTS

| | | |
|---|---|---|
| JP | H06-213722 | 8/1994 |
| JP | 2001-326367 | 11/2001 |
| JP | 2002-168702 | 6/2002 |
| JP | 2003-194630 | 7/2003 |
| JP | 2004-61283 | 2/2004 |
| JP | 2007-273982 | 10/2007 |
| WO | 2013/014707 | 1/2013 |

* cited by examiner

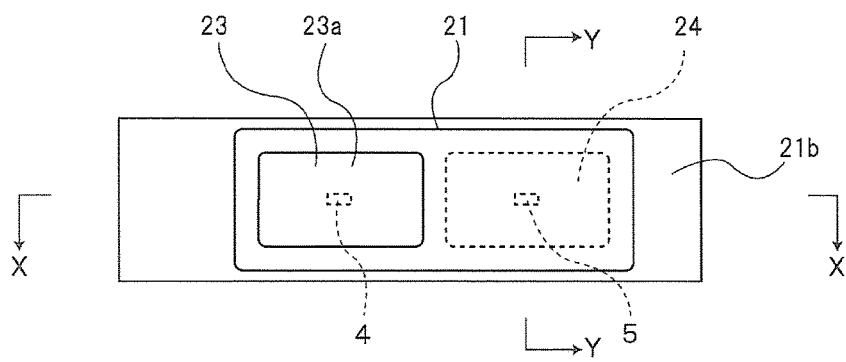
FIG. 2(a)
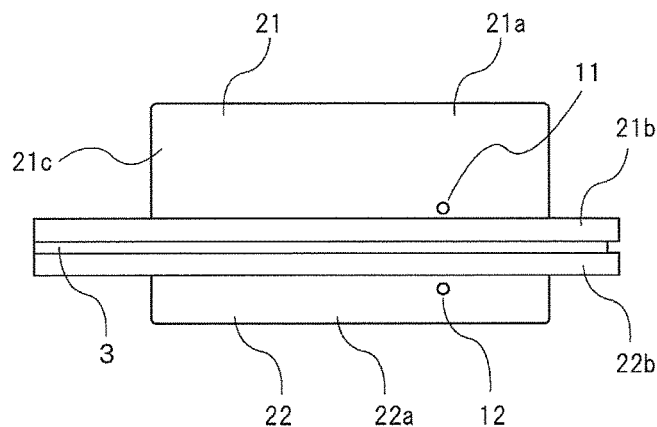 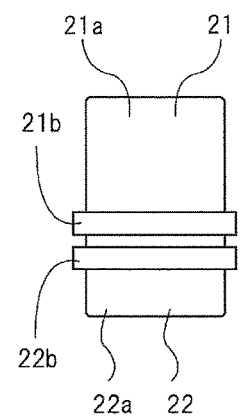
FIG. 2(b)  FIG. 2(c)
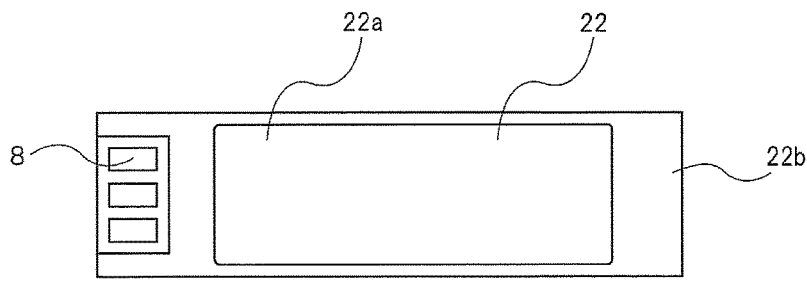
FIG. 2(d)

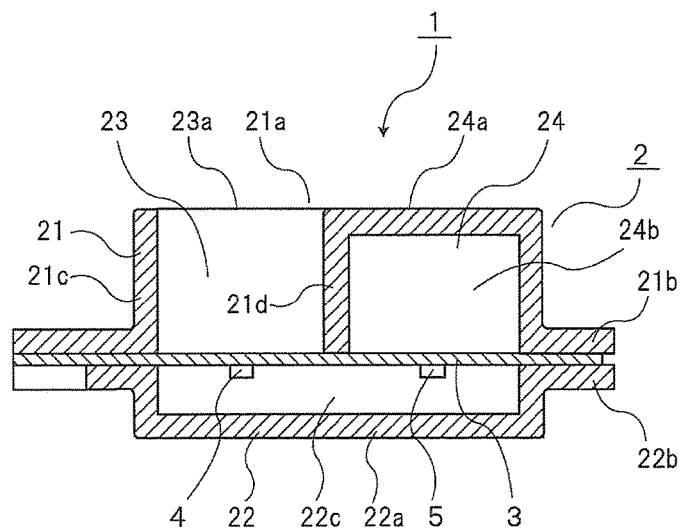
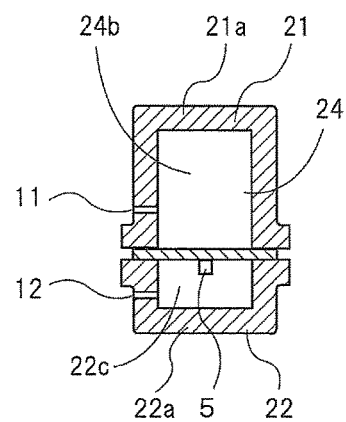
FIG. 3(a)　　　　　FIG. 3(b)
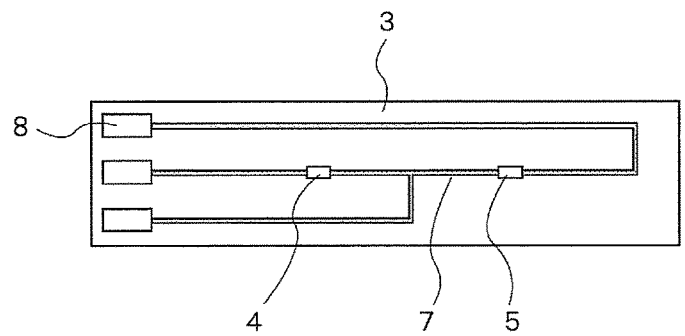
FIG. 4

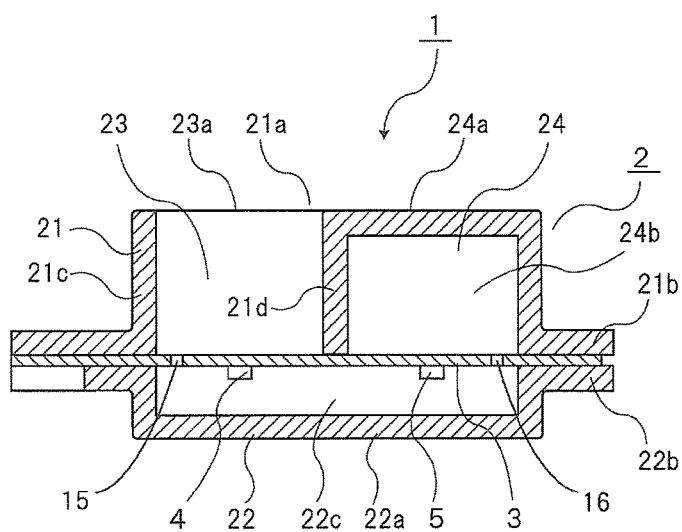
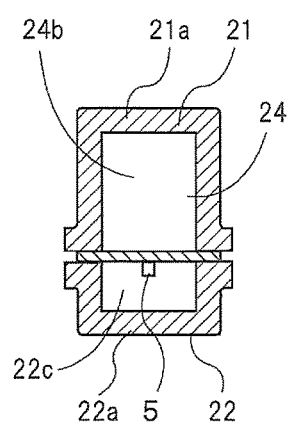
FIG. 9(a)    FIG. 9(b)
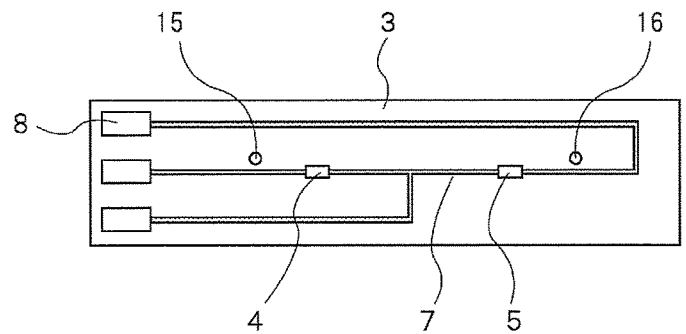
FIG. 10

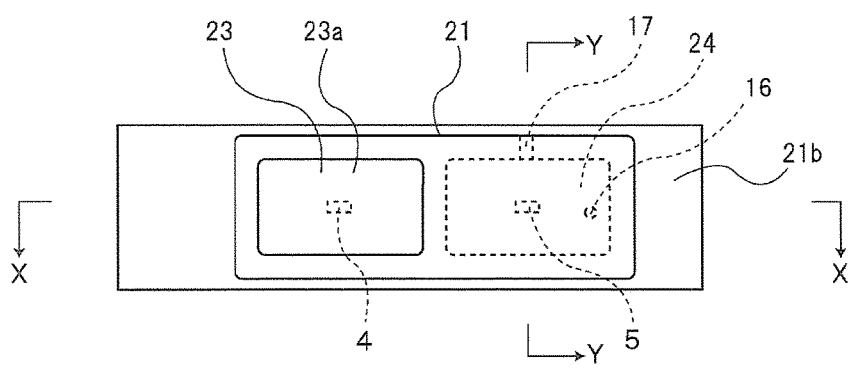
FIG. 11(a)
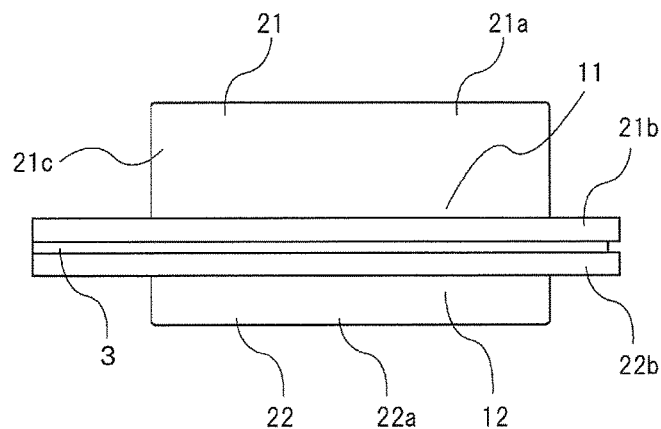 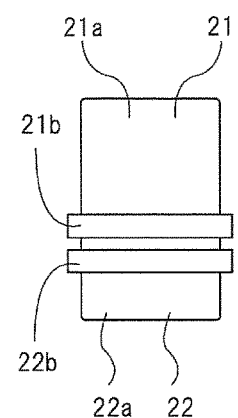
FIG. 11(b)     FIG. 11(c)
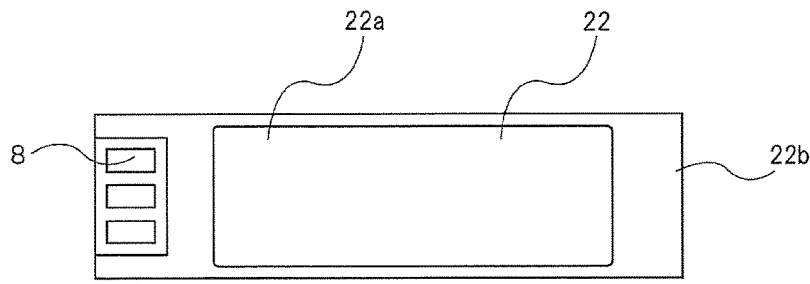
FIG. 11(d)

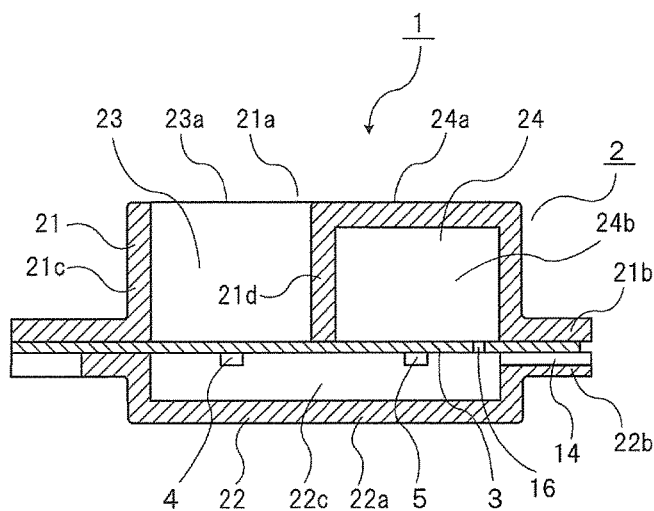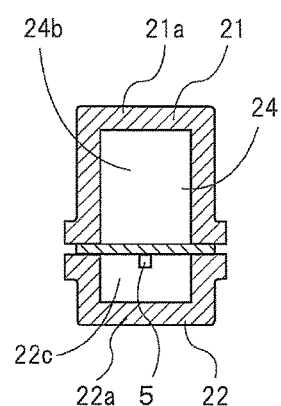
FIG. 15(a)   FIG. 15(b)
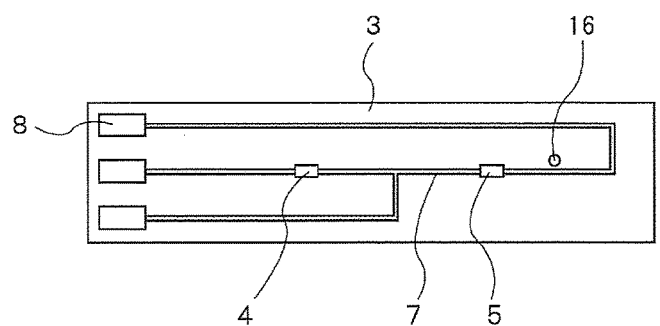
FIG. 16

INFRARED TEMPERATURE SENSOR AND DEVICE USING INFRARED TEMPERATURE SENSOR

CROSS-REFERENCE TO RELATED APPLICATION

This application is a 371 of international application of PCT application serial no. PCT/JP2014/070705, filed on Aug. 6, 2014, which claims the priority benefit of Japan application no. 2013-166563, filed on Aug. 9, 2013. The entirety of each of the abovementioned patent applications is hereby incorporated by reference herein and made a part of this specification.

BACKGROUND OF THE INVENTION

Field of the Invention

The invention relates to an infrared temperature sensor, which detects infrared light from an object to be detected to measure a temperature of the object to be detected, and a device using the infrared temperature sensor.

Description of Related Art

Conventionally, for example, an infrared temperature sensor that measures the temperature of an object to be detected by detecting the infrared light from the object in a non-contact manner has been used as the temperature sensor for measuring the temperature of the object, such as a heat fixing roller or the like used in a fixing device of a copy machine.

Such an infrared temperature sensor is provided with a temperature-compensation heat-sensitive element, in addition to an infrared-detection heat-sensitive element, so as to improve the followability with change of the ambient temperature and compensate for the change of the ambient temperature.

Moreover, the infrared-detection heat-sensitive element and the temperature-compensation heat-sensitive element are disposed on a heat-absorbing film, and the film is maintained in a sealed state by a case (see Patent Literature 1 to Patent Literature 3).

PRIOR ART LITERATURE

Patent Literature

Patent Literature 1: International Publication No. 2013/014707
Patent Literature 2: Japanese Patent Publication No. 2003-194630
Patent Literature 3: Japanese Patent Publication No. 2004-612834

SUMMARY OF THE INVENTION

Problem to be Solved

In regard to the conventional infrared temperature sensor described above, however, when the ambient temperature of the infrared temperature sensor increases, the air in the sealed space will expand and increase the internal pressure and cause the film to swell and deform. In addition, if the air in the space overly expands, the film deformation may result in problems such as cutting the wiring pattern disposed on the film. Furthermore, the amount of incident infrared light or the amount of heat radiation from the film may change due to the film deformation and result in variation of the output of the infrared temperature sensor.

The invention has been made in view of the aforementioned issues in order to provide an infrared temperature sensor capable of reducing film deformation and achieving high accuracy to ensure reliability, and a device using the infrared temperature sensor.

Solution to the Problem

An infrared temperature sensor of the disclosure is characterized in including: a film absorbing infrared light; a case covering and holding the film and forming a space between the case and the film, and including a light guide part and a shielding part, wherein the light guide part has an opening to guide the infrared light and the shielding part has a shielding wall to shield the infrared light; a ventilation portion allowing air permeation between the space and outside, wherein all portions of the space are sealed except at the ventilation portion; an infrared-detection heat-sensitive element disposed on the film within the space and arranged at a position corresponding to the light guide part; and a temperature-compensation heat-sensitive element disposed on the film within the space and arranged at a position corresponding to the shielding part.

The ventilation portion is a means that allows air permeation between the space and the outside. The formation position or form thereof is not particularly limited.

Although it is preferable to use thin film thermistors or chip thermistors as the infrared-detection heat-sensitive element and the temperature-compensation heat-sensitive element, the invention is not limited thereto. It is also possible to use thermocouples or temperature measuring resistors, for example.

According to the invention, film deformation can be reduced and high accuracy can be achieved to ensure reliability.

Based on the aforementioned infrared temperature sensor, the infrared temperature sensor of the disclosure is characterized in that the ventilation portion comprises a through hole formed in the case.

If the case is composed of a first case and a second case, for example, the through hole may be formed on at least one of the first case and the second case.

Based on the aforementioned infrared temperature sensor, the infrared temperature sensor of the disclosure is characterized in that the ventilation portion is forming between the case and the film.

Based on the aforementioned infrared temperature sensor, the infrared temperature sensor of the disclosure is characterized in that the ventilation portion includes through holes formed in the film corresponding to the light guide part and the shielding part.

Based on the aforementioned infrared temperature sensor, the infrared temperature sensor of the disclosure is characterized in that the ventilation portion includes a through hole formed in the film corresponding to the shielding part and a through hole formed in the case.

Based on the aforementioned infrared temperature sensor, the infrared temperature sensor of the disclosure is characterized in that the light guide part and the shielding part are formed substantially symmetrically with a partition wall, which partitions the light guide part and the shielding part, as an axis.

Based on the aforementioned infrared temperature sensor, the infrared temperature sensor of the disclosure is characterized in that a wiring pattern, to which the infrared-detection heat-sensitive element and the temperature-compensation heat-sensitive element are connected, is formed on the film, and a heat-cured product that is mixed with a filler of fine particles and has an insulating property is encapsulated in a connection part between an external lead-out terminal connected with the wiring pattern and an external lead wire.

Based on the aforementioned infrared temperature sensor, the infrared temperature sensor of the disclosure is characterized in that the filler of the fine particles has a primary particle size of 5 nm-80 nm.

Based on the aforementioned infrared temperature sensor, the infrared temperature sensor of the disclosure is characterized in that the heat-cured product is an epoxy resin and the filler of the fine particles is silica, calcium carbonate, carbon nanotube, or graphite.

Based on the aforementioned infrared temperature sensor, the infrared temperature sensor of the disclosure is characterized in that a wiring pattern, to which the infrared-detection heat-sensitive element and the temperature-compensation heat-sensitive element are connected, is formed on the film, and an external lead-out terminal connected with the wiring pattern and an external lead wire are connected via a relay terminal.

A device includes an infrared temperature sensor. The infrared temperature sensor includes: a film absorbing infrared light; a case covering and holding the film and forming a space between the case and the film, and including a light guide part and a shielding part, wherein the light guide part includes an opening to guide the infrared light and the shielding part includes a shielding wall to shield the infrared light; a ventilation portion allowing air permeation between the space and outside, wherein all portions of the space are sealed except at the ventilation portion; an infrared-detection heat-sensitive element disposed on the film within the space and arranged at a position corresponding to the light guide part; and a temperature-compensation heat-sensitive element disposed on the film within the space and arranged at a position corresponding to the shielding part.

The infrared temperature sensor can be applied to a variety of devices, such as a fixing device of a copy machine, a battery unit, an IH cooking heater, and so on. The devices to which the invention may be applied are not particularly limited.

Effects of the Invention

According to the invention, an infrared temperature sensor capable of reducing film deformation and achieving high accuracy to ensure reliability, and a device using the infrared temperature sensor can be provided.

BRIEF DESCRIPTION OF THE DRAWINGS

FIG. 2(a) is a plan view, FIG. 2(b) is a front view, FIG. 2(c) is a side view, and FIG. 2(d) is a rear view showing the same infrared temperature sensor.

FIG. 3(a) is a cross-sectional view along the line X-X of FIG. 2(a) and FIG. 3(b) is a cross-sectional view along the line Y-Y.

FIG. 4 is a plan view showing the wiring connection relationship of the same infrared temperature sensor.

FIG. 9(a) is a cross-sectional view along the line X-X of FIG. 8(a) and FIG. 9(b) is a cross-sectional view along the line Y-Y.

FIG. 10 is a plan view showing the wiring connection relationship of the same infrared temperature sensor.

FIG. 11(a) is a plan view, FIG. 11(b) is a front view, FIG. 11(c) is a side view, and FIG. 11(d) is a rear view showing the infrared temperature sensor according to the fourth embodiment of the invention.

FIG. 15(a) is a cross-sectional view along the line X-X of FIG. 14(a) and FIG. 15(b) is a cross-sectional view along the line Y-Y.

FIG. 16 is a plan view showing the wiring connection relationship of the same infrared temperature sensor.

DESCRIPTION OF THE EMBODIMENTS

Figure 1:
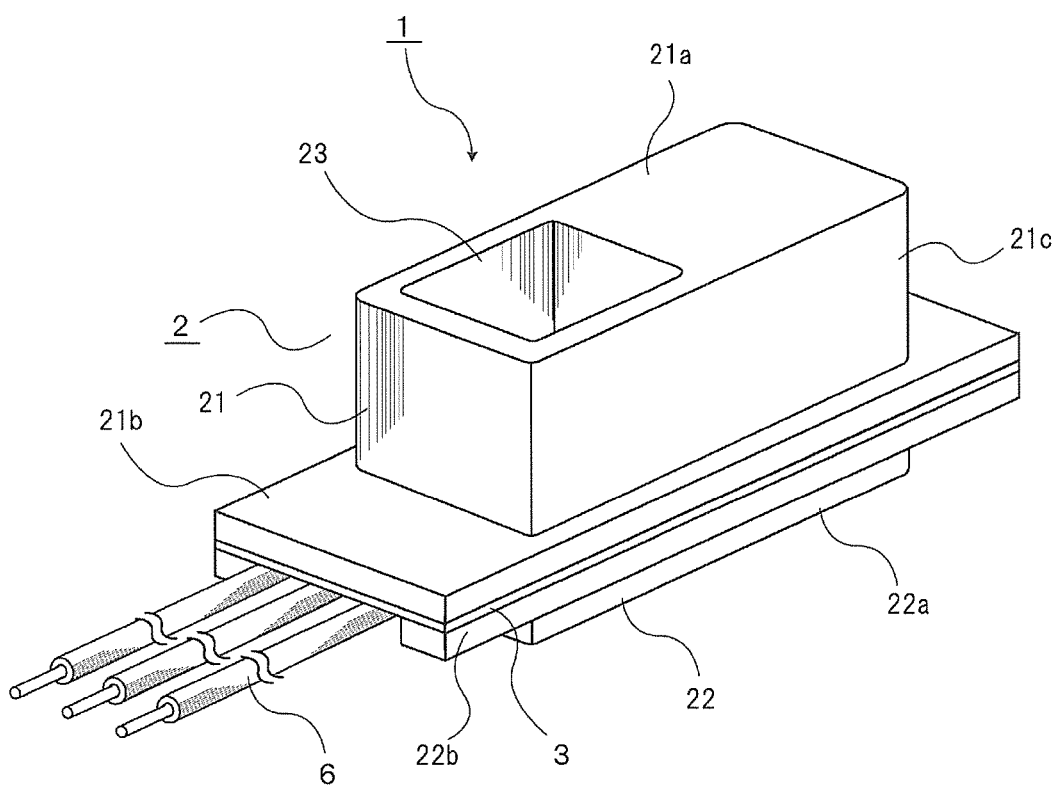
FIG. 1 is a perspective view showing the infrared temperature sensor according to the first embodiment of the invention.
Figure 5A:
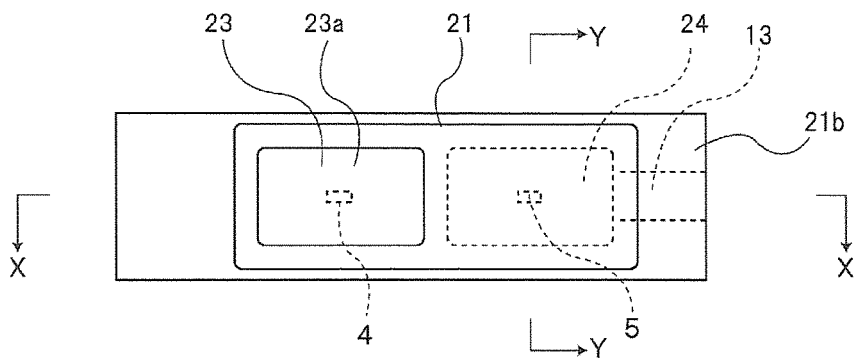
FIG. 5(a) is a plan view.
Figure 5B:
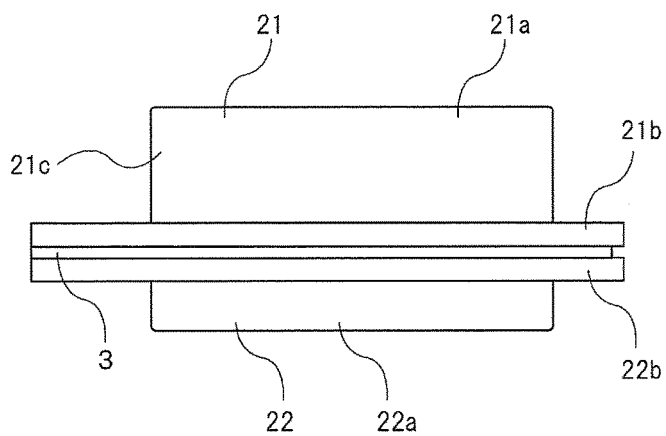
FIG. 5(b) is a front view.
Figure 5C:
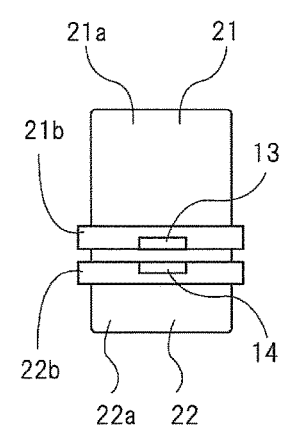
FIG. 5(c) is a side view.
Figure 5D:
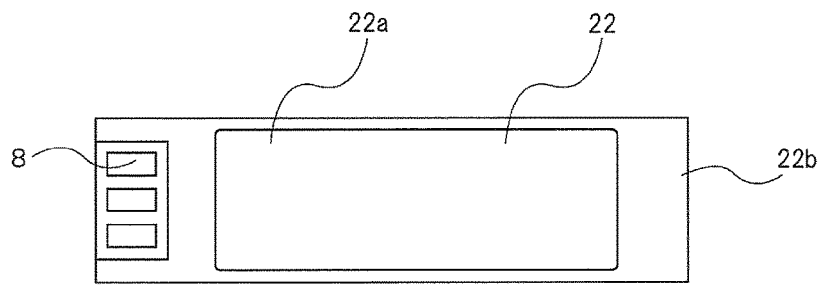
FIG. 5(d) is a rear view showing infrared temperature sensor according to the second embodiment of the invention.

Hereinafter, an infrared temperature sensor according to the first embodiment of the invention is described with reference to FIG. 1 through FIG. 4. FIG. 1 is a perspective view of the infrared temperature sensor, and FIG. 2(a) is a plan view, FIG. 2(b) is a front view, FIG. 2(c) is a side view, and FIG. 2(d) is a rear view. In addition, FIG. 3(a) and FIG. 3(b) are cross-sectional views and FIG. 4 is a plan view showing a wiring connection relationship on a film. In the respective figure, the scale of each member and part is modified to an appropriate size to help understand the member and part.

As shown in FIG. 1 and FIG. 2(a) to FIG. 2(d), an infrared temperature sensor 1 includes a case 2, a film 3, and an infrared-detection heat-sensitive element 4 and a temperature-compensation heat-sensitive element 5 disposed on the film 3.

The case 2 is composed of a first case 21 and a second case 22. Specifically, the first case 21 is a holder and the second case 22 is a cover member. Moreover, the case 2 is formed of a resin material such as nylon, PBT (polybutylene terephthalate), PPS (poly phenylene sulfide), or ABS (acrylonitrile butadiene styrene), for example.

However, the material that forms the case 2 is not particularly limited. A material obtained by including a filler such as carbon, metal, and ceramics in a resin, a metallic material such as aluminum, copper, iron, and nickel, or a material obtained by applying a black coating face to a metallic material can also be used.

The first case 21 includes a substantially rectangular parallelepiped main body 21a protruding toward the front side (the upper side of FIG. 2(*b*)) and a substantially rectangular flange part 21b formed around the main body 21a. A light guide part 23 that guides infrared light and a shielding part 24 that shields infrared light are formed in the main body 21a.

As shown in FIG. 3(*a*) to FIG. 3(*b*), the light guide part 23 has an opening 23a at the front side and is formed into a cylindrical shape, which is substantially rectangular parallelepiped, with a side wall 21c and a partition wall 21d. The partition wall 21d is located at a boundary between the light guide part 23 and the shielding part 24 to separate the light guide part 23 and the shielding part 24. A black paint or an alumite treatment, for example, may be applied to an inner peripheral surface of the light guide part 23 as required to form an infrared absorption layer. Moreover, metal polishing or metal plating may be performed on the inner peripheral surface of the light guide part 23 to form a reflective surface.

The shielding part 24 is disposed adjacent to the light guide part 23 and is formed substantially symmetrical to the light guide part 23 with the partition wall 21d as the axis. The shielding part 24 has a shielding wall 24a at the front side and a substantially rectangular parallelepiped space 24b is formed by the side wall 21c and the partition wall 21d. In addition, the rear side opposite to the shielding wall 24a is opened.

The second case 22 includes a substantially rectangular parallelepiped main body 22a protruding toward the rear side (the lower side of FIG. 2(*b*)) and a substantially rectangular flange part 22b formed around the main body 22a. The main body 22a is formed into a form that substantially matches the shape of the rear side of the main body 21a of the first case 21, and a continuous space 22c is formed on the inner side of the main body 22a corresponding to the light guide part 23 and the shielding part 24.

In this embodiment, as described later, a ventilation portion is disposed to allow air permeation between the space 22c and the space 24b of the shielding part 24 and the outside.

The film 3 is a resin film formed in a substantially rectangular shape. As shown in FIG. 4, a wiring pattern 7 is formed on a surface, and the infrared-detection heat-sensitive element 4 and the temperature-compensation heat-sensitive element 5 are connected and disposed on the wiring pattern 7. An external lead-out terminal 8 is formed at an end of the wiring pattern 7. An external lead wire 6 is electrically connected to the external lead-out terminal 8 by means of soldering or welding.

The film 3 can be a resin composed of a polymer material such as fluorine, silicon, polyimide, polyester, polyethylene, polycarbonate, PPS (polyphenylene sulfide), and so on. Other materials may also be used if they absorb infrared light. Moreover, a material that is obtained by mixing and dispersing carbon black or an inorganic pigment (one or more of chrome yellow, Bengal red, titanium white, and ultramarine blue) into these resins and is capable of absorbing infrared light of substantially all wavelengths may be used.

By combining and bonding the first case 21 and the second case 22, the film 3 is interposed and fixed between the flange part 21b of the first case 21 and the flange part 22b of the second case 22. Moreover, in this case, the infrared-detection heat-sensitive element 4 is arranged at a position corresponding to the light guide part 23 and the temperature-compensation heat-sensitive element 5 is arranged at a position corresponding to the shielding part 24. Both the infrared-detection heat-sensitive element 4 and the temperature-compensation heat-sensitive element 5 are positioned on the side of the space 22c of the second case 22.

Further, by combining the first case 21 and the second case 22, the film 3 is covered and held by the case 2, and the aforementioned space 22c and space 24b are formed and sealed between the case 2 and the film 3.

Here, as shown in FIG. 2(*b*) and FIG. 3(*b*), a through hole 11 is formed on the main body 21a (side wall 21c) of the first case 21 and located close to the film 3 corresponding to the shielding part 24 to serve as the ventilation portion that allows air permeation between the space 24b and the outside. Furthermore, a through hole 12 is formed close to the film 3 on the main body 22a of the second case 22 to likewise serve as the ventilation portion that allows air permeation between the space 22c and the outside.

Although not particularly limited, the through holes 11 and 12 are preferably formed to be about $\varphi 1$ μm-$\varphi 800$ μm, so as to prevent hot air or wind from entering the space 22c and the space 24b.

The through hole is preferably formed on both the sides of the first case 21 and the second case 22. Nevertheless, the through hole may be formed on at least one of the cases, i.e. the side of the first case 21 or the side of the second case 22.

The infrared-detection heat-sensitive element 4 detects infrared light from an object to be detected to measure a temperature of the object to be detected. The temperature-compensation heat-sensitive element 5 detects the ambient temperature to measure the ambient temperature. The infrared-detection heat-sensitive element 4 and the temperature-compensation heat-sensitive element 5 at least include heat-sensitive elements that have substantially equal temperature characteristics, and are disposed on the film 3.

Specifically, the infrared-detection heat-sensitive element 4 and the temperature-compensation heat-sensitive element 5 include a ceramics semiconductor, such as a thermistor containing metal oxides of Mn, Co, Ni, Ti, Al, Zn, Cu, and Fe. Because the ceramics semiconductor has a high B constant, i.e. temperature coefficient, the ceramics semiconductor can sensitively detect temperature change of the film 3 that absorbs infrared light.

It is desirable that the ceramics semiconductor has a crystal structure with a cubic spinel phase as the main phase. In this case, due to absence of anisotropy and an impurity layer, variation of electrical characteristics in the ceramics sintered body is small, and highly accurate measurement becomes possible when multiple infrared temperature sensors are used. Moreover, because of the stable crystal structure, the reliability with respect to environment resistance is high as well. For the ceramics semiconductor, a single phase crystal structure composed of a cubic spinel phase is most desirable.

In addition, the infrared-detection heat-sensitive element 4 and the temperature-compensation heat-sensitive element 5 are preferably selected from thermistor elements and thin film thermistors, which are obtained from the same wafer formed by the ceramics semiconductor, based on a resistance value within a predetermined allowable error.

In this case, a relative error in the B constant between the infrared-detection heat-sensitive element 4 and the temperature-compensation heat-sensitive element 5 provided in pair is small, and therefore the temperature difference between them that detect the temperature simultaneously can be detected with high accuracy. Moreover, for the infrared-detection heat-sensitive element 4 and the temperature-compensation heat-sensitive element 5, it is not required to perform an operation of selecting the B constant or a process of adjusting the resistance value, and thus the productivity can be improved.

The structure of the thermistor element to be used in the infrared-detection heat-sensitive element 4 and the temperature-compensation heat-sensitive element 5 may be any of a bulk, a laminate, a thick film, and a thin film, for example.

Next, an operation of the infrared temperature sensor 1 is described. The infrared light emitted from the surface of the object to be detected enters through the opening 23a of the light guide part 23 of the infrared temperature sensor 1 and is guided by and passes through the light guide part 23 to reach the film 3. The infrared light that reaches the film 3 is absorbed by the film 3 and converted into heat energy.

The converted heat energy is transmitted to the infrared-detection heat-sensitive element 4 and increases the temperature of the infrared-detection heat-sensitive element 4. The infrared-detection heat-sensitive element 4 and the temperature-compensation heat-sensitive element 5 are ceramics semiconductors that at least have approximately equal temperature characteristics, and the resistance value of the infrared-detection heat-sensitive element 4 changes due to the infrared light from the object to be detected.

Meanwhile, although the infrared light is blocked by the shielding wall 24a of the shielding part 24, the temperature of the case 2 is increased by the radiation heat from the object to be detected or the ambient atmosphere temperature, and thus the resistance value of the temperature-compensation heat-sensitive element 5 also undergoes a change in resistance value corresponding to the temperature rise of the case 2.

In this case, since the light guide part 23 and the shielding part 24 are forming substantially symmetrically with the partition wall 21d as the axis, the infrared-detection heat-sensitive element 4 and the temperature-compensation heat-sensitive element 5 can change in the same way with respect to the ambient temperature change to prevent influence on thermal disturbance, so as to reliably detect the temperature change caused by the infrared light from the object to be detected.

In a case where the case 2 is formed using a material having thermal conductivity such as a metal, the temperature change of the infrared temperature sensor 1 can be uniformized as a whole following the ambient temperature change.

In the operation described above, in terms of the conventional infrared temperature sensor, when the ambient temperature of the infrared temperature sensor increases, the air in the sealed space will expand and increase the internal pressure and cause the film to swell and deform. When the air in the space expands excessively, problems such as cutting the wiring pattern disposed on the film may occur. Moreover, repetitive increase and decrease of the internal pressure of the space will deteriorate film deformation.

In this embodiment, however, the first case 21 is provided with the through hole 11 and the second case 22 is provided with the through hole 12. Therefore, even in a temperature environment that will raise the internal pressure of the spaces 24b and 22c, the through hole 11 and the through hole 12 can ensure air permeation between the spaces 24b and 22c and the outside to suppress increase of the internal pressure and reduce deformation of the film 3. Specifically, the space 24b communicates with the outside through the through hole 11 and the space 22c communicates with the outside through the through hole 12.

This embodiment as described above can provide the infrared temperature sensor 1 that is capable of reducing film deformation and achieving high accuracy to ensure reliability.

Next, an infrared temperature sensor according to the second embodiment of the invention is described with reference to FIG. 5 through FIG. 7. FIG. 5(*a*) is a plan view, FIG. 5(*b*) is a front view, FIG. 5(*c*) is a side view, and FIG. 5(*d*) is a rear view. In addition, FIG. 6(*a*) and FIG. 6(*b*) are cross-sectional views and FIG. 7 is a plan view showing the wiring connection relationship on the film. Parts the same as or equivalent to those of the first embodiment are assigned with the same reference numerals and the repeated description is omitted.

In this embodiment, the infrared temperature sensor has the same basic structure as the first embodiment. The two embodiments are different in formation of the ventilation portion that allows air permeation between the space 24b and the space 22c and the outside. The ventilation portion is formed between the case 2 and the film 3.

Figures 6A, 6B:
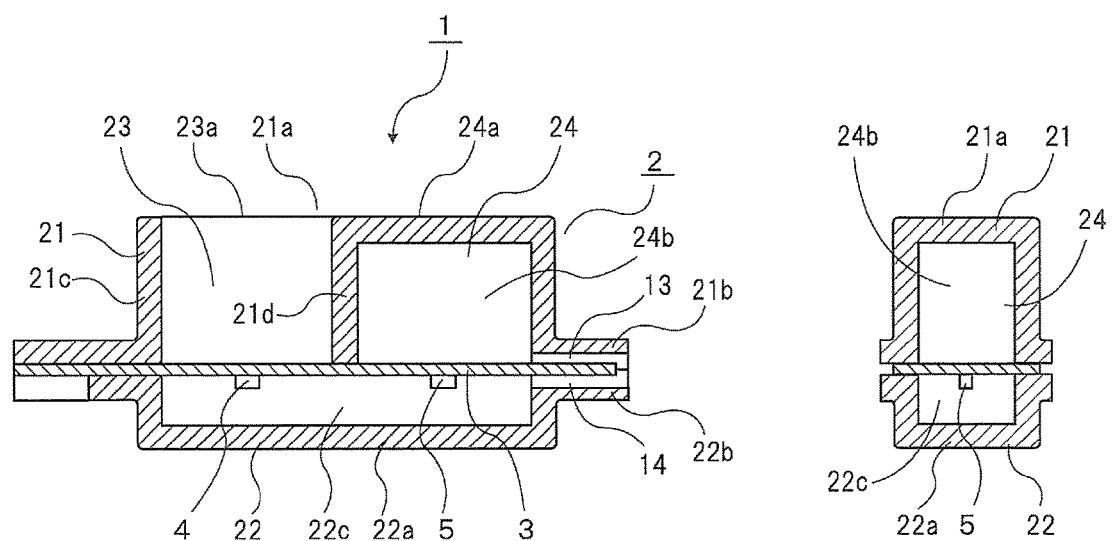
FIG. 6(a) is a cross-sectional view along the line X-X of FIG. 5(a) and FIG. 6(b) is a cross-sectional view along the line Y-Y.
Figure 7:
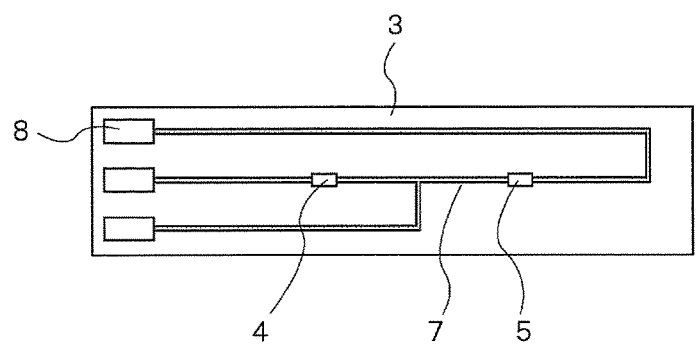
FIG. 7 is a plan view showing the wiring connection relationship of the same infrared temperature sensor.
Figure 8A:
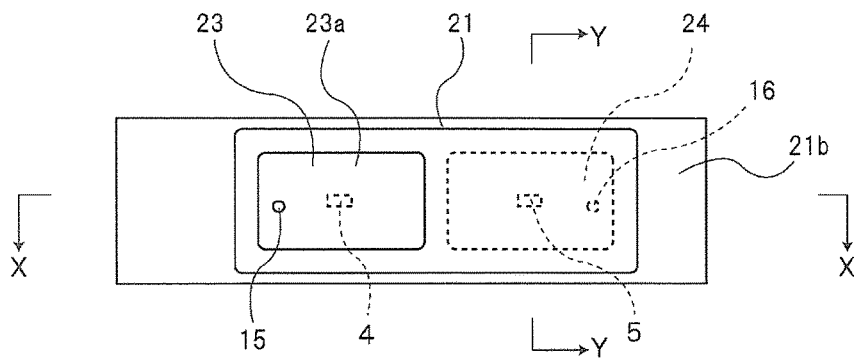
FIG. 8(a) is a plan view.
Figure 8B:
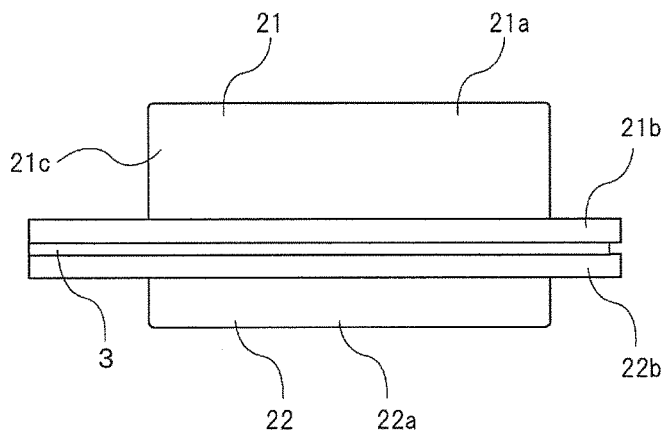
FIG. 8(b) is a front view.
Figure 8C:
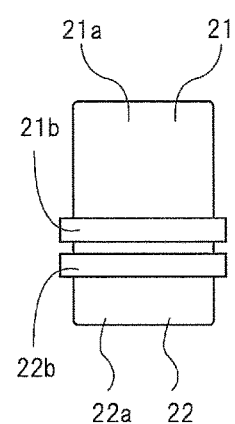
FIG. 8(c) is a side view.
Figure 8D:
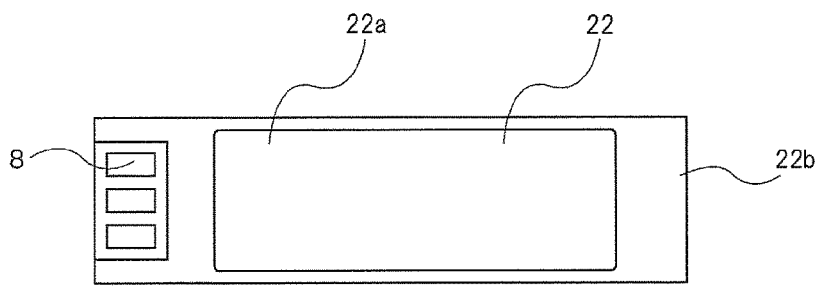
FIG. 8(d) is a rear view showing the infrared temperature sensor according to the third embodiment of the invention.

As shown in FIG. 5(*a*) and FIG. 5(*c*) and FIG. 6(*a*), a groove 13 is formed on the flange part 21b of the first case 21 and a groove 14 is formed on the flange part 22b of the second case 22 to serve as the ventilation portion. The grooves 13 and 14 formed on the case 2 are opposite to each other with the film 3 interposed therebetween. Therefore, the ventilation portion (grooves 13 and 14) are formed between the case 2 and the film 3. Although not particularly limited, the ventilation portion (grooves 13 and 14) are preferably formed at an interval of 1 μm-500 μm, so as to prevent hot air or wind from entering the space 22c and the space 24b.

Accordingly, the space 24b communicates with the outside through the groove 13 and the space 22c communicates with the outside through the groove 14. Therefore, increase of the internal pressure of the space 24b and the space 22c can be suppressed to reduce deformation of the film 3.

The ventilation portion may also be configured by forming a slight gap between the substantially whole periphery of the flange part 21b of the first case 21 and the film 3 and between the substantially whole periphery of the flange part 22b of the second case 22 and the film 3. In this case, it can be configured by a method of moderating the tightness for combining the first case 21 and the second case 22, for example.

Like the first embodiment, this embodiment as described above can provide the infrared temperature sensor 1 that is capable of reducing film deformation and achieving high accuracy to ensure reliability.

Next, an infrared temperature sensor according to the third embodiment of the invention is described with reference to FIG. 8 through FIG. 10. FIG. 8(*a*) is a plan view, FIG. 8(*b*) is a front view, FIG. 8(*c*) is a side view, and FIG. 8(*d*) is a rear view. In addition, FIG. 9(*a*) and FIG. 9(*b*) are cross-sectional views and FIG. 7 is a plan view showing the wiring connection relationship on the film. Parts the same as or equivalent to those of the first embodiment are assigned with the same reference numerals and the repeated description is omitted.

The infrared temperature sensor of this embodiment has the same basic structure as the first embodiment, but the two embodiments are different in formation of the ventilation portion that allows air permeation between the space 24*b* and the space 22*c* and the outside.

As shown in FIG. 8(*a*), FIG. 9(*a*), and FIG. 10, through holes 15 and 16 penetrating the film 3 from the front to the rear are formed at positions corresponding to the light guide part 23 and the shielding part 24 to avoid the wiring pattern 7 to serve as the ventilation portion. Although not particularly limited, the through holes 15 and 16 are preferably formed to be 1 μm-500 μm, so as to prevent hot air or wind from entering the space 22*c* and the space 24*b*.

Accordingly, the space 22*c* communicates with the outside through the through hole 15 and the space 24*b* communicates with the outside through the through hole 15 via the space 22*c* from the through hole 16.

Accordingly, like each embodiment described above, increase of the internal pressure of the space 24*b* and the space 22*c* can be suppressed to reduce deformation of the film 3, and high accuracy can be achieved to ensure reliability.

Then, an infrared temperature sensor according to the fourth embodiment of the invention is described with reference to FIG. 11 through FIG. 13. FIG. 11(*a*) is a plan view, FIG. 11(*b*) is a front view, FIG. 11(*c*) is a side view, and FIG. 11(*d*) is a rear view. In addition, FIG. 12(*a*) and FIG. 12(*b*) are cross-sectional views and FIG. 13 is a plan view showing the wiring connection relationship on the film. Parts the same as or equivalent to those of the first embodiment are assigned with the same reference numerals and the repeated description is omitted.

The infrared temperature sensor of this embodiment has the same basic structure as the first embodiment, but the two embodiments are different in formation of the ventilation portion that allows air permeation between the space 24*b* and the space 22*c* and the outside.

Figures 12A, 12B:
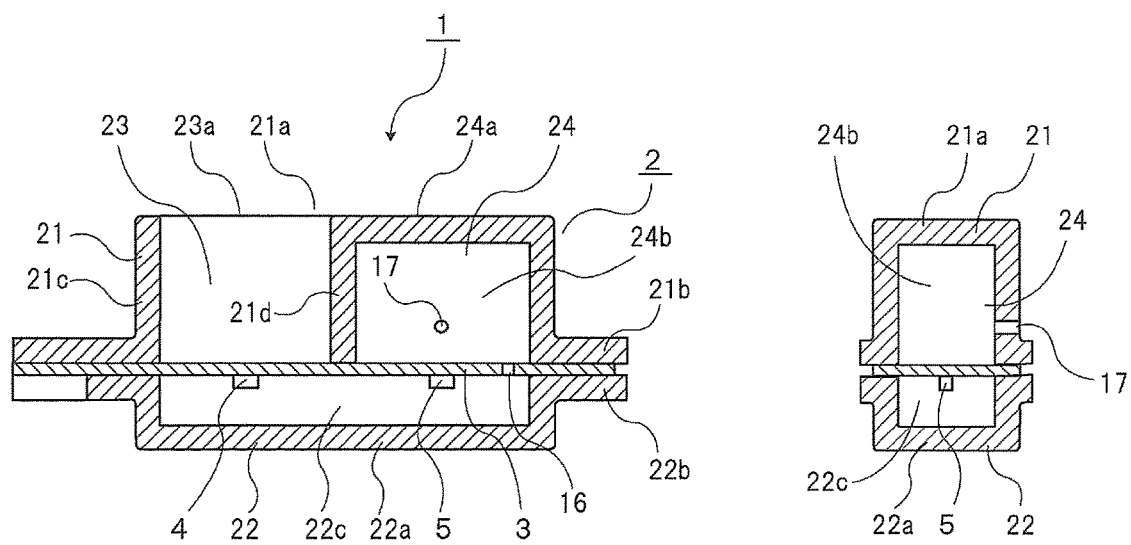
FIG. 12(a) is a cross-sectional view along the line X-X of FIG. 11(a) and FIG. 12(b) is a cross-sectional view along the line Y-Y.
Figure 13:
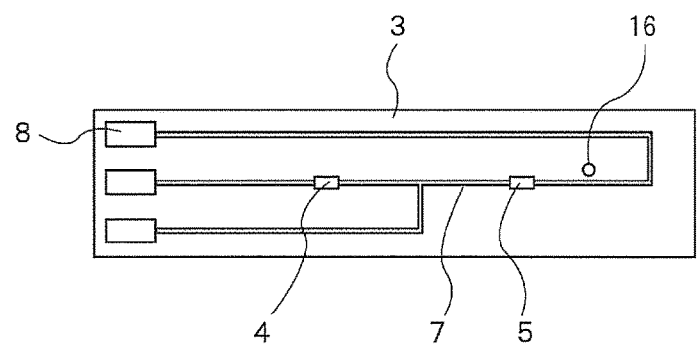
FIG. 13 is a plan view showing the wiring connection relationship of the same infrared temperature sensor.

As shown in FIG. 11(*a*), FIG. 12(*a*) and FIG. 12(*b*), and FIG. 13, the through hole 16 penetrating the film 3 from the front to the rear is formed at a position corresponding to the shielding part 24 to avoid the wiring pattern 7 to serve as the ventilation portion. Moreover, the through hole 17 is formed on the main body 21*a* (side wall 21*c*) of the first case 21 and located close to the film 3 corresponding to the shielding part 24 to serve as the ventilation portion.

Accordingly, the space 24*b* communicates with the outside through the through hole 17 and the space 22*c* communicates with the outside through the through hole 17 via the space 24*b* from the through hole 16.

Nevertheless, the through hole 17 formed on the main body 21*a* of the first case 21 may be formed on the main body 22*a* of the second case 22.

Accordingly, like each embodiment described above, increase of the internal pressure of the space 24*b* and the space 22*c* can be suppressed to reduce deformation of the film 3.

Figure 14A:
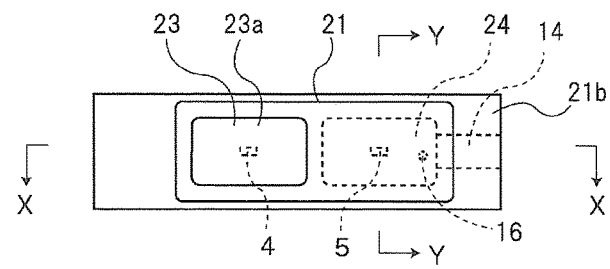
FIG. 14(a) is a plan view.
Figures 14B, 14C:
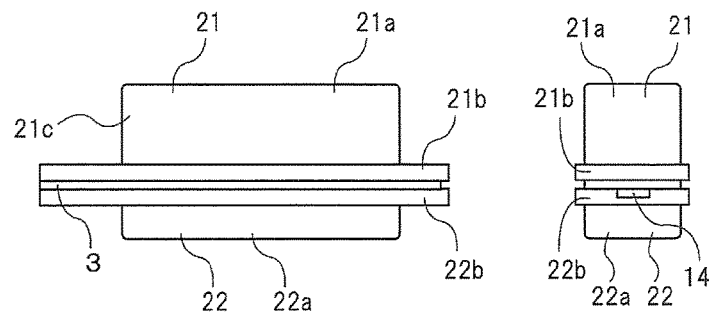
FIG. 14(b) is a front view.
FIG. 14(c) is a side view.
Figure 14D:
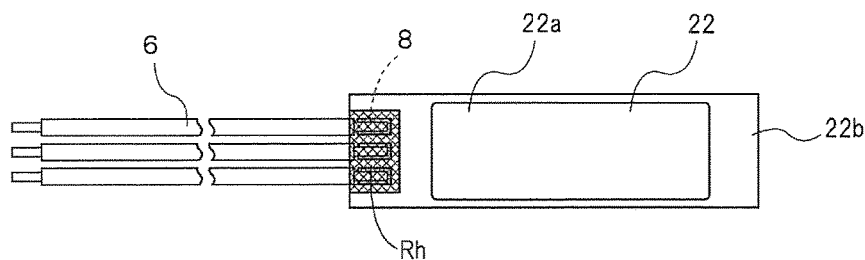
FIG. 14(d) is a rear view showing the infrared temperature sensor according to the fifth embodiment of the invention.

Next, an infrared temperature sensor according to the fifth embodiment of the invention is described with reference to FIG. 14 through FIG. 16. FIG. 14(*a*) is a plan view, FIG. 14(*b*) is a front view, FIG. 14(*c*) is a side view, and FIG. 14(*d*) is a rear view. In addition, FIG. 15(*a*) and FIG. 15(*b*) are cross-sectional views and FIG. 16 is a plan view showing the wiring connection relationship on the film. Parts the same as or equivalent to those of the first embodiment are assigned with the same reference numerals and the repeated description is omitted.

The infrared temperature sensor of this embodiment has the same basic structure as the first embodiment, but the two embodiments are different in formation of the ventilation portion that allows air permeation between the space 24*b* and the space 22*c* and the outside. In addition, a connection configuration of the external lead wire 6 is illustrated.

As shown in FIG. 14(*a*), FIG. 15(*a*) and FIG. 15(*b*), and FIG. 16, the through hole 16 penetrating the film 3 from the front to the rear is formed at a position corresponding to the shielding part 24 to avoid the wiring pattern 7 to serve as the ventilation portion. Moreover, the groove 14 is formed on the flange part 22*b* of the second case 22. Accordingly, the space 24*b* communicates with the outside through the groove 14 via the space 22*c* from the through hole 16, and the space 22*c* communicates with the outside through the groove 14. Therefore, increase of the internal pressure of the space 24*b* and the space 22*c* can be suppressed.

As shown in FIG. 14(*d*) and FIG. 16, the external lead wire 6 is electrically connected with the external lead-out terminal 8 by soldering or the like.

In this case, a method of encapsulating an insulating heat-cured product Rh, such as epoxy resin, to protect a connection part of the soldering or the like is adopted to improve the strength and reliability of the connection part. However, because the epoxy resin is highly fluid, the epoxy resin may flow around to the opposite side along a seam between the film 3 and the case 1 or along the film 3 when being encapsulated. Consequently, problems may occur, that is, the groove 14, which serves as the ventilation portion for example, may be blocked by the epoxy resin and cause the space 24*b* and the space 22*c* to be sealed.

In this embodiment, a filler of fine particles is mixed into the epoxy resin, i.e. the heat-cured product Rh, to thicken or add thixotropy to the liquid of the epoxy resin, so as to suppress the epoxy resin from flowing around. Accordingly, it is possible to prevent the space 24*b* and the space 22*c* from being sealed.

Silica is the optimum material for the filler of the fine particles, and by mixing fine particles having a primary particle size of 5 nm-80 nm into the epoxy resin, the fluidity can be kept low. Accordingly, the phenomenon that the epoxy resin flows around is eliminated, and it is possible to prevent the space 24*b* and the space 22*c* from being sealed. Although it is preferable to use silica as the material of the filler of the fine particles, carbon nanotube, graphite, and calcium carbonate may also be used. In the case of using calcium carbonate, the primary particle size for thickening or adding thixotropy is about 80 μm at most.

Figure 17A:
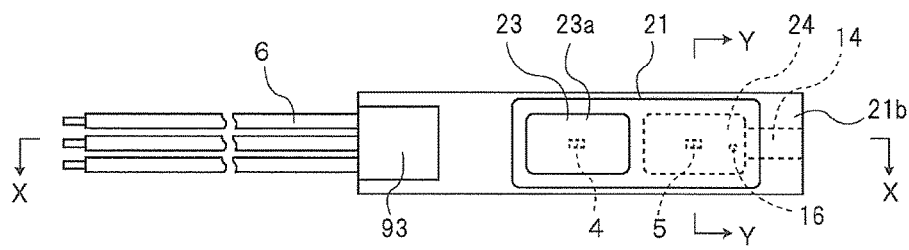
FIG. 17(a) is a plan view.
Figures 17B, 17C:
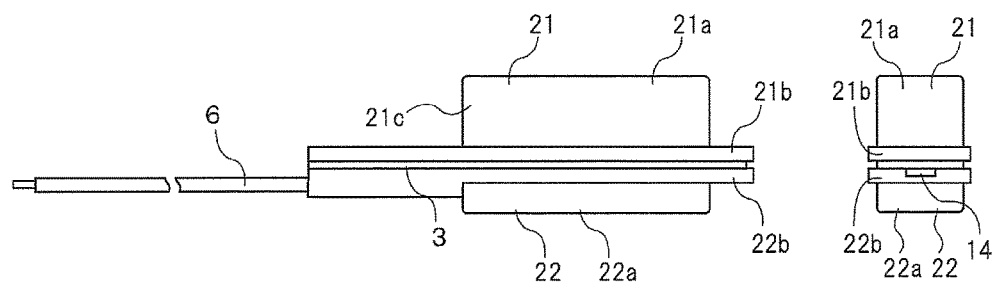
FIG. 17(b) is a front view.
FIG. 17(c) is a side view.

Next, an infrared temperature sensor according to the sixth embodiment of the invention is described with reference to FIG. 17 through FIG. 19. FIG. 17(*a*) is a plan view, FIG. 17(*b*) is a front view, FIG. 17(*c*) is a side view, and FIG. 17(*d*) is a rear view. In addition, FIG. 18(*a*) and FIG. 18(*b*) are cross-sectional views and FIG. 19 is a plan view showing the wiring connection relationship on the film. Parts the same as or equivalent to those of the fifth embodiment are assigned with the same reference numerals and the repeated description is omitted.

The infrared temperature sensor of this embodiment has the same structure as the fifth embodiment and the formations of the ventilation portion are also the same, but a relay terminal 9 is used in the connection configuration of the external lead wire 6.

That is, the external lead-out terminal 8 is connected with the external lead wire 6 via the relay terminal 9. The relay terminal 9 includes a connection terminal part 91 that is slightly wider and a lead part 92 that extends from the connection terminal part 91. In addition, the relay terminal 9 is integrated in a holding member 93, formed of a resin material, by insert molding.

In the relay terminal 9, the lead part 92 is electrically connected with the external lead-out terminal 8 by means of soldering or welding, and then the second case is combined with the first case. The holding member 93 is fixed by a fixing means (not shown) on the side of the second case 22.

Figure 17D:
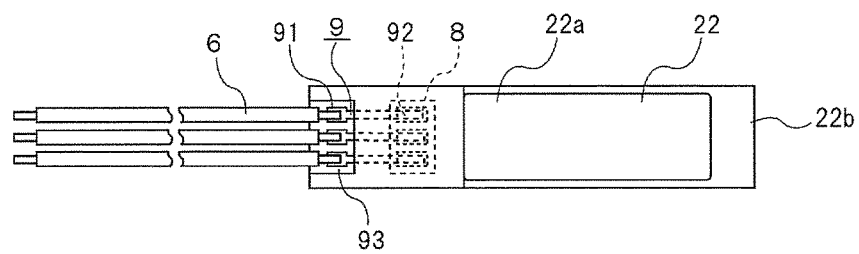
FIG. 17(d) is a rear view showing the infrared temperature sensor according to the sixth embodiment of the invention.
Figures 18A, 18B:
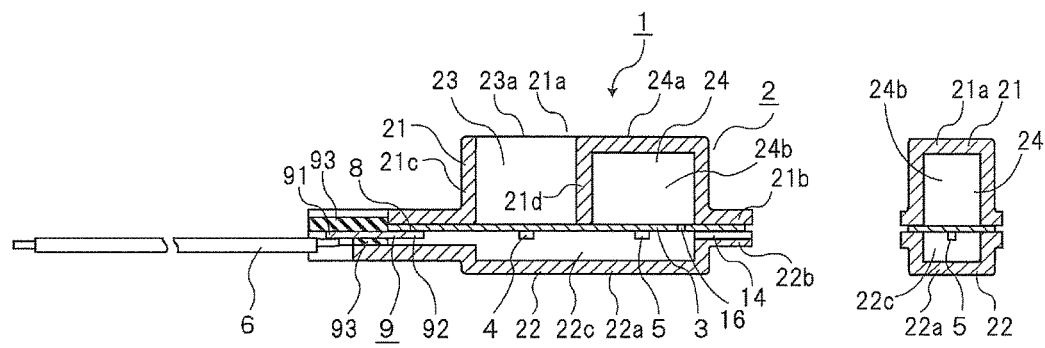
FIG. 18(a) is a cross-sectional view along the line X-X of FIG. 17(a) and FIG. 18(b) is a cross-sectional view along the line Y-Y.
Figure 19:
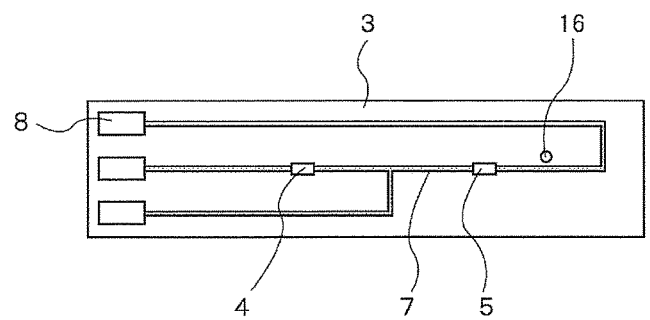
FIG. 19 is a plan view showing the wiring connection relationship of the same infrared temperature sensor.

According to such a structure, the connection terminal part 91 of the relay terminal 9 is exposed to the outside on the rear side of the case 2 (see FIG. 17(d) and FIG. 18(a)). Therefore, after the first case and the second case are combined, any external lead wire 6 can be connected with the connection terminal part 91 by means of soldering or welding.

Accordingly, the external lead wire 6 is connected via the relay terminal 9 with no direct contact to the external lead-out terminal 8 formed on the film 3. Thus, the connection strength can be enhanced and it is not required to encapsulate the insulating heat-cured product Rh, such as epoxy resin, in the connection part of the soldering or the like. Thereby, it is possible to prevent the problem of blocking of the ventilation portion that occurs when the heat-cured product Rh, such as highly fluid epoxy resin, is used.

In addition, by using the relay terminal 9, it is possible to cope with various types, such as different lengths, of the external lead wire 6, and mass productivity may be improved. In other words, the infrared temperature sensor 1 can be managed in a state where the external lead wire 6 is not connected, and corresponding to the types, e.g. different lengths, of the external lead wire 6, the external lead wire 6 can be connected with such an infrared temperature sensor 1.

According to this embodiment as described above, the problem of blocking the ventilation portion can be avoided. In the case where the number of types, e.g. different lengths, of the external lead wire 6 increases and many types are produced in small quantities, mass productivity can still be ensured.

The infrared temperature sensor 1 in each embodiment described above can be applied to and disposed in a variety of devices, such as a fixing device of a copy machine, a battery unit, an IH cooking heater, and so on. The devices to which the invention may be applied are not particularly limited.

The invention is not limited to the configuration of each of the aforementioned embodiments. Various modifications may be made without departing from the spirit of the invention. In addition, the aforementioned embodiment is disclosed as one example and is not intended to limit the scope of the invention.

For example, the formation position, shape, or number of the ventilation portion is not particularly limited as long as the ventilation portion is formed to communicate the sealed spaces with the outside.

In addition, although it is preferable to use thin film thermistors or chip thermistors formed of ceramics semiconductors as the infrared-detection heat-sensitive element and the temperature-compensation heat-sensitive element, the invention is not limited thereto. It is also possible to use thermocouples or temperature measuring resistors.

What is claimed is:

1. An infrared temperature sensor, comprising:
a film absorbing infrared light;
a case covering and holding the film and forming a space between the case and the film, and comprising a light guide part and a shielding part, wherein the light guide part comprises an opening to guide the infrared light and the shielding part comprises a shielding wall to shield the infrared light;
a ventilation portion allowing air permeation between the space and outside, wherein all portions of the space are sealed except at the ventilation portion;
an infrared-detection heat-sensitive element disposed on the film within the space and arranged at a position corresponding to the light guide part; and
a temperature-compensation heat-sensitive element disposed on the film within the space and arranged at a position corresponding to the shielding part.

2. The infrared temperature sensor according to claim 1, wherein the ventilation portion comprises a through hole formed in the case.

3. The infrared temperature sensor according to claim 1, wherein the ventilation portion is formed between the case and the film.

4. The infrared temperature sensor according to claim 1, wherein the ventilation portion comprises through holes formed in the film corresponding to the light guide part and the shielding part.

5. The infrared temperature sensor according to claim 1, wherein the ventilation portion comprises a through hole formed in the film corresponding to the shielding part and a through hole formed in the case.

6. The infrared temperature sensor according to claim 1, wherein the light guide part and the shielding part are formed substantially symmetrically with a partition wall, which partitions the light guide part and the shielding part, as an axis.

7. The infrared temperature sensor according to claim 1, wherein a wiring pattern, to which the infrared-detection heat-sensitive element and the temperature-compensation heat-sensitive element are connected, is formed on the film, and a heat-cured product that is mixed with a filler of fine particles and has an insulating property is encapsulated in a connection part between an external lead-out terminal connected with the wiring pattern and an external lead wire.

8. The infrared temperature sensor according to claim 7, wherein the filler of the fine particles has a primary particle size of 5 nm-80 nm.

9. The infrared temperature sensor according to claim 7, wherein the heat-cured product is an epoxy resin and the filler of the fine particles is silica, calcium carbonate, carbon nanotube, or graphite.

10. The infrared temperature sensor according to claim 1, wherein a wiring pattern, to which the infrared-detection heat-sensitive element and the temperature-compensation heat-sensitive element are connected, is formed on the film, and an external lead-out terminal connected with the wiring pattern and an external lead wire are connected via a relay terminal.

11. A device comprising an infrared temperature sensor, wherein the infrared temperature sensor comprises:
a film absorbing infrared light;
a case covering and holding the film and forming a space between the case and the film, and comprising a light guide part and a shielding part, wherein the light guide part comprises an opening to guide the infrared light and the shielding part comprises a shielding wall to shield the infrared light;
a ventilation portion allowing air permeation between the space and outside, wherein all portions of the space are sealed except at the ventilation portion;

an infrared-detection heat-sensitive element disposed on the film within the space and arranged at a position corresponding to the light guide part; and
a temperature-compensation heat-sensitive element disposed on the film within the space and arranged at a position corresponding to the shielding part.

\* \* \* \* \*